US009137576B2

(12) United States Patent
McRae

(10) Patent No.: US 9,137,576 B2
(45) Date of Patent: Sep. 15, 2015

(54) DEVICE BASED ONE BUTTON SHOPPING USING METADATA

(75) Inventor: Matthew Blake McRae, Laguna Beach, CA (US)

(73) Assignee: Vizio Inc., Irvine, CA (US)

( * ) Notice: Subject to any disclaimer, the term of this patent is extended or adjusted under 35 U.S.C. 154(b) by 515 days.

(21) Appl. No.: 12/824,460

(22) Filed: Jun. 28, 2010

(65) Prior Publication Data

US 2011/0321071 A1 Dec. 29, 2011

(51) Int. Cl.
*G06F 3/00* (2006.01)
*G06F 13/00* (2006.01)
*H04N 5/445* (2011.01)
*H04N 21/478* (2011.01)
*G06Q 30/06* (2012.01)
*H04N 21/434* (2011.01)

(52) U.S. Cl.
CPC ......... *H04N 21/47815* (2013.01); *G06Q 30/06* (2013.01); *H04N 21/4348* (2013.01)

(58) Field of Classification Search
CPC ............ H04N 5/44582; H04N 5/4828; H04N 5/44591; H04N 21/4622; H04N 21/47815; H04N 21/8133; H04N 21/84
USPC ................................ 725/40, 43, 50–53, 60, 5
See application file for complete search history.

(56) References Cited

U.S. PATENT DOCUMENTS

| 7,720,712 | B1 * | 5/2010 | Allocca et al. ............... 705/27.1 |
| 2003/0110507 | A1 * | 6/2003 | Dimitrova et al. ............ 725/110 |
| 2003/0167209 | A1 * | 9/2003 | Hsieh .............................. 705/26 |
| 2005/0234880 | A1 * | 10/2005 | Zeng et al. ........................ 707/3 |
| 2006/0026080 | A1 * | 2/2006 | Rodriguez et al. .............. 705/26 |
| 2006/0190379 | A1 * | 8/2006 | Maas et al. ...................... 705/35 |
| 2008/0066100 | A1 * | 3/2008 | Brodersen et al. ............. 725/35 |
| 2009/0018898 | A1 * | 1/2009 | Genen ............................ 705/10 |

* cited by examiner

*Primary Examiner* — Yassin Alata
(74) *Attorney, Agent, or Firm* — Law Office of Scott C. Harris, Inc.

(57) ABSTRACT

A television is interfaced to one or more on-line stores through a network connection. The television has purchasing data stored in a configuration file. Upon execution of a "one-button buy" function, metadata from a content stream and the purchasing data is used to find a purchase item related to the content stream, decide upon an on-line store and purchase the purchase item from the on-line store. In some embodiments, the a "one-button buy" function is a dedicated "buy" button on a remote control that is associated with the television. In some embodiments, without any further interaction, the purchase item is billed to the viewer and shipped to the viewer as if the viewer found the purchase item through the on-line store from a personal computer.

15 Claims, 16 Drawing Sheets

DEVICE BASED ONE BUTTON SHOPPING USING METADATA

CROSS-REFERENCE TO RELATED APPLICATION

This application is related to U.S. patent application titled "DEVICE-BASED SEARCH USING METADATA," Ser. No. 12/824,443, filed Jun. 28, 2010.

FIELD

This invention relates to the field of display devices and more particularly to a system for providing an enhanced search and purchase capability to a display device such as a television.

BACKGROUND

Television devices such as LCD or Plasma televisions are becoming more sophisticated each year. Most new models of televisions have a processor and memory and a remote control as an input device. The television is connected to a multitude of content sources such as cable-television set-top-boxes, Blu-ray players, DVD disk players, Video Cassette Recorders (VCR), game consoles, media players (e.g. IPod), etc. The content often includes Metadata, otherwise known as data about data, included with the content and available to the television through the interface to the content source.

An early example of Metadata used in the television industry relates to the vertical blanking interval (VBI). The VBI relates to scanning performed by analog display technology and it is the time difference between the last line of one frame or field of a raster display and the beginning of the next. VBI data is present in analog television signals such as VGA, DVI, etc. Video frames are transmitted during the VBI, but are not displayed on the screen. For example, in cathode ray tube based televisions, the electron beam is blanked (shut off) to avoid displaying artifacts on the CRT as the electron beam location is retraced to the beginning of the next line. The VBI was originally needed because of the inductive inertia of the magnetic coils which deflect the electron beam.

The vertical blanking interval is used for sending Metadata encoded in the video signal. Since any video signal sent during the VBI is not displayed on the screen; various data is encoded by, for example, the XDS protocol (e.g., the content ratings for V-chip), closed captioning, information about the current show, etc. Even though many modern displays do not "retrace," many legacy signals such as VGA still include VBI intervals and still provide for the transmission of VBI information.

New televisions no longer require the VBI because LCD, LED and Plasma displays no longer deflect an electron beam across the face of the display. Such televisions typically have legacy input ports to support analog sources of content, and, therefore are able to extract the VBI data. For digital content, televisions have digital input ports such as High Definition Multimedia Interface (HDMI) ports, network connections (e.g. Ethernet for downloading content), etc. In the digital protocols used over these interfaces, Metadata is encoded in special packets. For example, some Metadata packets provide content protection, descriptions of the content (e.g. actors, music score, format), closed captioning, etc. In another example, Metadata is carried in the Program and System Information Protocol (PSIP), a protocol used in the Advanced Television Systems Committee for digital television transmission (ATSC) digital television system for carrying metadata about each channel in the broadcast transport stream of a TV station. It includes information related to television programs such as title and description. Metadata is also encoded into MPEG input streams from, for example, cable television signals.

Often a viewer watching is unaware of the Metadata unless the Metadata content rating prevents them from watching, for example, adult content or unless the viewer is using closed caption. Notwithstanding, the Metadata is present and transferred from content sources to the viewer's television.

Viewers watching a particular program sometimes desire more information about the program, cast, locale, directors, etc. The viewers sometimes want to purchase and maybe buy a copy of the content. For example when they are viewing a trailer or advertisement, they may want to buy the movie or soundtrack. When watching advertisements or commercials, the viewers sometimes want more information or want to purchase a product currently advertised. Many of these and similar needs of viewers are often satisfied by the viewer leaving the television and accessing a computer, often located in another room, to search various databases such as the Internet Movie Database (IMDB), a TV Guide, Internet search engines (e.g. Google), Internet sales (e.g. Netflix, Amazon), etc.

What is needed is a system that extracts Metadata from a content stream and uses elements of the Metadata in a one-button purchase of a product related to the content stream.

SUMMARY

The present invention includes a device such as a television interfaced to one or more servers through a network connection. Upon a "buy" request, the television extracts metadata from a video stream or content that is currently being viewed and incorporates the metadata along with previously stored purchase data to visit at least one on-line store and purchase the product identified in the metadata from one of the at least one on-line stores. It is anticipated that the metadata be a standard metadata stream as exists today or a custom metadata stream tailored to provide, for example, search keywords or purchasing information such as product codes.

The television has purchasing data stored in a configuration file, for example, on-line store addresses, on-line store account information, default shipping addresses, selection defaults, email addresses and selection criteria. In this example, the viewer already has a relationship with the on-line store and has set up a payment method with that on-line store such as a credit card or other payment option including, for example, bill later or paypal. Upon execution of a "one-button buy" function, metadata from a content stream and the purchasing data is used to find a purchase item related to the content stream, decide upon an on-line store and purchase the purchase item from the on-line store. In some embodiments, the a "one-button buy" function is a dedicated "buy" button on a remote control that is associated with the television. In some embodiments, without any further interaction, the purchase item is billed to the viewer and shipped to the viewer as if the viewer found the purchase item through the on-line store from a personal computer.

In one embodiment, a system for simplified purchasing from a device is disclosed including a configuration file containing purchasing data and a video stream at the device, the video stream having related metadata. At least one term is extracted from the metadata and a purchase is initiated using the purchasing data and the at least one term.

In another embodiment, a method of purchasing from a device is disclosed; the television is connected to a network.

The method includes (a) storing purchasing data in a configuration file and (b) upon receiving a buy request, at least one term is extracted from metadata, the metadata related to content currently being viewed on a display of the device. (c) One or more on-line stores are accessed using the purchasing data and the at least one term, finding a product related to the at least one term from at least one of the on-line stores. (d) A best on-line store is selected from the one or more on-line stores that have the product and (e) a purchase of the product is initiated at the best on-line store.

In another embodiment, a method of purchasing from a device is disclosed; the device is connected to a network. The method includes (a) entering purchasing data into a user interface which operates at the device and (b) storing the purchasing data in a configuration file. (c) Upon receiving a buy request, at least one term is extracted from metadata, the metadata being related to content currently being viewed on a display of the device. (d) a connection is made to one or more on-line stores using the purchasing data and the at least one term and (e) a product is found related to the at least one term from at least one of the on-line stores. (f) A purchase of the product is initiated at the best on-line store.

In another embodiment, a television is disclosed including a processor that is in digital communication with a network and a display operably interfaced to the processor. The television has a configuration file that includes purchasing data is also interfaced to the processor. Content such as a video data stream is accessible to the processor. The television has access to metadata that describes or relates the content. The television includes a circuit that receives a request for a purchase relating to the content (e.g. receives a command from a remote control). Software formats a purchase request from the at least one term and the purchase data responsive to the circuit, connects to at least one on-line store through the network and sends the purchase request to the at least one on-line store, later receiving confirmation of the purchase.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
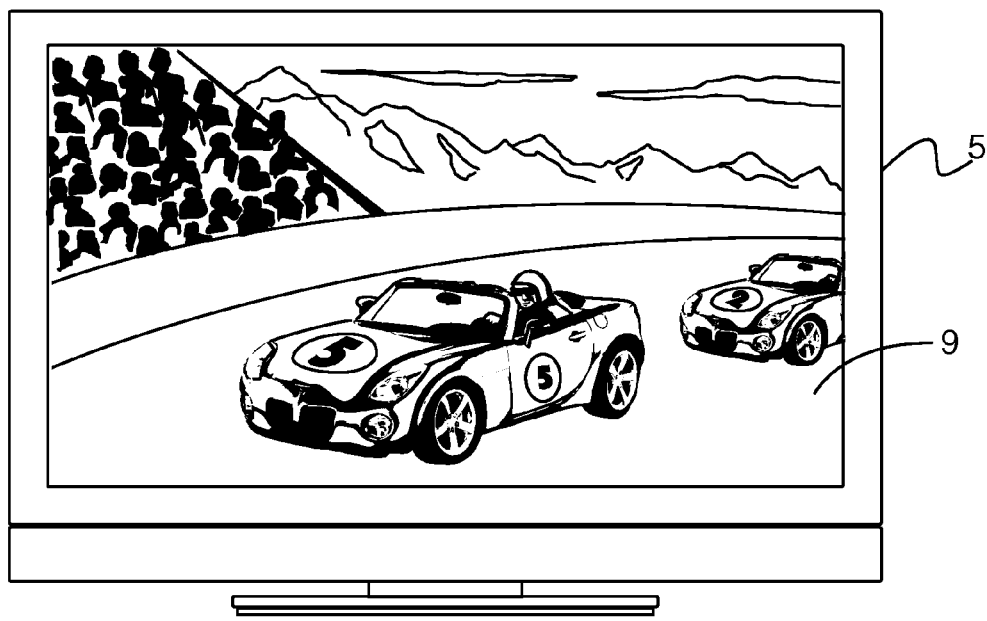
FIG. 1 illustrates a schematic view of a television with a typical program being viewed.

Reference will now be made in detail to the presently preferred embodiments, examples of which are illustrated in the accompanying drawings. Throughout the following detailed description, the same reference numerals refer to the same elements in all figures. The term, "one button shopping," "one remote button shopping," etc. refers to a form of purchasing that requires minimal viewer interaction at the time of purchase. In that, the viewer has previously configured the device (television) with data that is later used during the purchase. For example, the viewer pre-configures the television web addresses of on-line stores, account information, credit card information, limits, preferences, etc. Later, while viewing content such as a movie trailer or advertisement, the viewer initiates the purchase of, for example, the full-length movie or product being advertised through an instant-buy feature which is, preferably, a single button on the remote control (but not limited to a single button). After invoking the instant-buy feature, the television uses the previously entered data to access one or more on-line stores and attempts to complete the purchase with no (or little) subsequent viewer interaction. It is anticipated that many purchase are completed without any further interaction; for example, when watching a movie trailer, the "buy" button is pressed and three days later, a DVD version of the movie is delivered to the viewer's preferred address. It is also anticipated that, for some types of products, minimal user interaction is required; for example, when watching a commercial for a diet supplement, the "buy" button is pressed, the on-line store is consulted and the viewer is prompted to enter whether they want a 30 day supply or a 90 day supply and after selecting, the selected product is delivered three days later to the viewer's preferred address. Even though the term "buy" is used throughout, "buy" refers to any transaction, including renting. For example, when watching a movie trailer, the "buy" button is pressed and three days later, a DVD rental version of the movie is delivered to the viewer's preferred address, for example by Blockbuster or NetFlix. Furthermore, the delivery of the purchased product is sometimes a download copy such as an electronic book to a reader or a download version of the movie to a computer, the television, a network connected player such as a Blu-ray player, etc. It is also anticipated that, in some examples, there is no charge for the item. For example, when watching a commercial for reverse mortgages, the "buy" button is pressed and three days later, a DVD sales video is delivered to the viewer's preferred address.

The term metadata refers to description data that is stored either internally, in the same file or stream as the main data, or externally, in a separate file or stream. Metadata that is embedded with content is called embedded metadata. With internal metadata, the metadata is transmitted together with the data it describes; thus, the metadata is always available and is easily manipulated. Externally stored metadata is also available, for example in a database, providing more efficient searching. Metadata is often transferred simultaneously when using streaming. There are many sources of metadata and all sources are anticipated. For example, metadata is available in a program being streamed over IP or metadata is available from a database that is accessible over a network via a search (e.g. IMDB). Programs received over the air (broadcast) have metadata available in the transport stream (ATSC) or within a program listing such as an electronic program guide database or an external database available through a network. In another example, metadata for a program received over an HDMI connection is available from a network connection to the device that is source of the program (i.e. Set-Top Box, DVD Player, External Tuner, etc).

Throughout this description, a television is used as an exemplary device that accesses content and metadata. Many other devices corresponding to the structure and/or methods described are anticipated. Any device having a display capable of viewing still and/or motion content is anticipated such as cellular phones, media players, digital cameras, portable televisions, etc.

Referring to FIG. 1, a schematic view of a television 5 with a typical program 9 being viewed is described. The viewer is watching content 9, in this example, the movie "Cars." The viewer wants additional information about the program 9. Previously, the viewer was able to find limited information from an electronic program guide. Such information was often limited to the name of the program 9, a short synopsis a few of the cast members, the year released and running time. This information did not contain the detail and robustness of information found, for example, found on the Internet. This information did not provide any facilities for the viewer to purchase the program 9, advertised products, related products, related goods, etc. Previously, the viewer that desired such information and products had to use a phone or a personal computer to do so.

Figure 2:
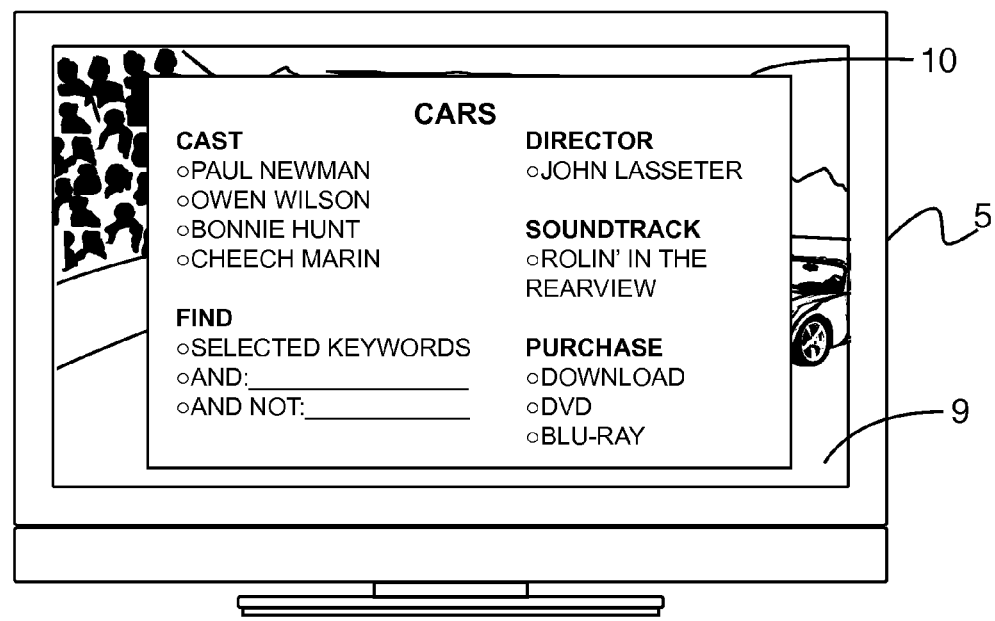
FIG. 2 illustrates a schematic view of a television with a search menu displayed over the program.

Referring to FIG. 2, a schematic view of a television 5 with a search menu 10 displayed over the program 9 is described. This menu appears in response to the viewer, for example, initiating a function on a remote control 111 (see FIGS. 12 and 13). In this example, the television 5 sends a query to a search engine such as Google, IMDB, etc (described later) and learns that the program 9 is the movie "Cars" and some attributes about the program 9 are displayed such as the cast, the director and the soundtrack. The viewer is provided with selection capabilities such as radio buttons (as shown), drop down lists, check boxes, etc as known in the industry.

Figure 3:
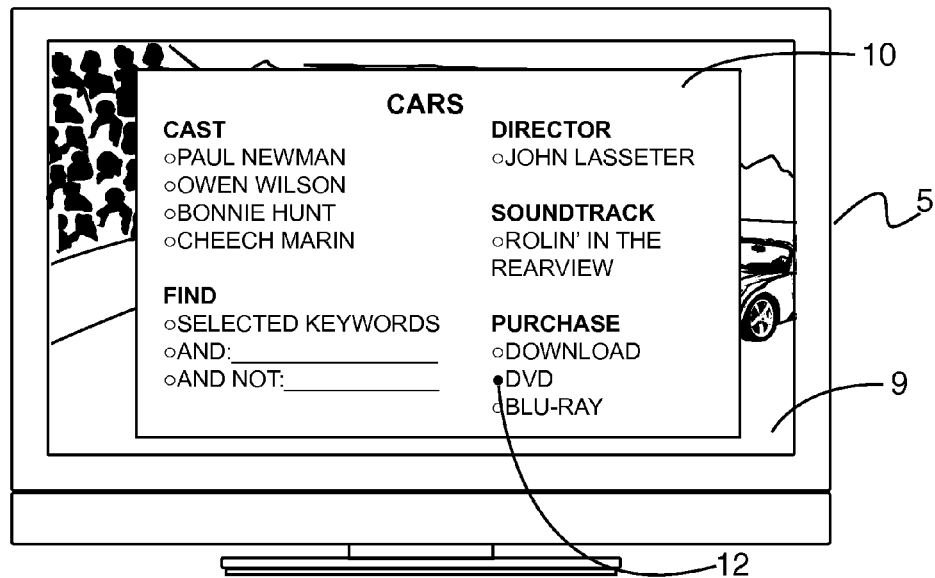
FIG. 3 illustrates a schematic view of a television with a search menu displayed over the program and a selection made.

Referring to FIG. 3, a schematic view of a television 5 with a search menu 10 displayed over the program 9 and a selection 12 having been made is described. In this example, the viewer has selected that they are interested in purchasing a DVD of the movie, "Cars," by maneuvering to the radio button next to DVD 12 and selecting that radio button. Again, there are many user interfaces known for selecting menu items on a display, all of which are included here within.

Figure 4:
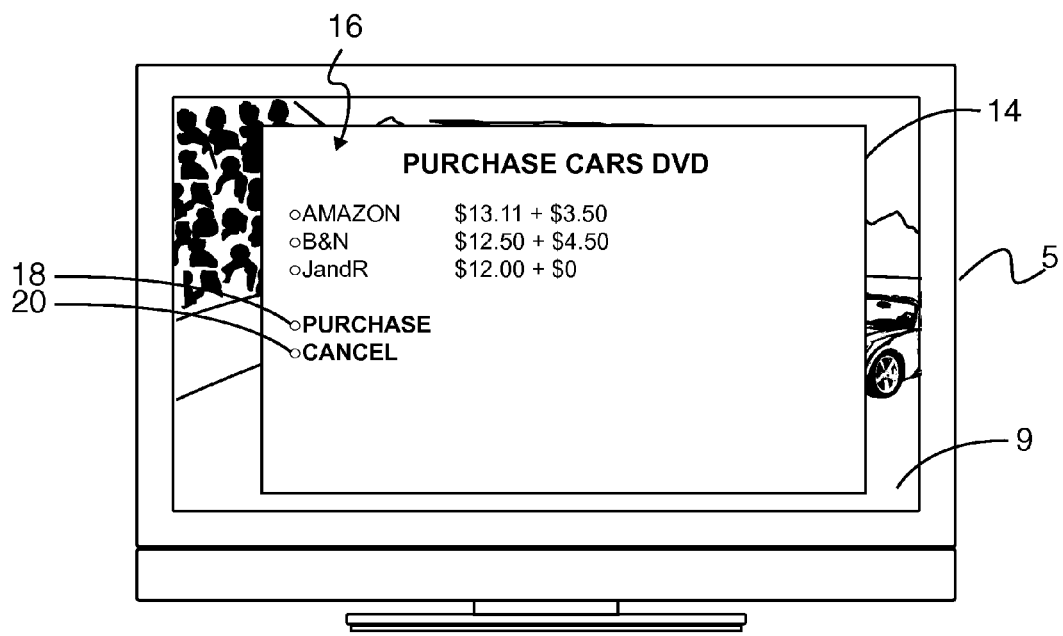
FIG. 4 illustrates a schematic view of a television with a content purchase menu displayed over the program.

Referring to FIG. 4, a schematic view of a television 5 with a content purchase menu 14 displayed over the program 9 is described. In this, the television 5 has sent searches to one or more Internet providers (as will be described later) and has found the DVD of "Cars" available for purchase at three locations 16 along with the offered price (e.g. $13.11) and the shipping costs (e.g. $3.50). If the viewer finds one of the offers for purchase acceptable, the viewer selects the provider 16 (e.g. selects the radio button associated with one of the providers) and then selects the "purchase" action button 18. The purchase is made using profile information associated with the viewer as will be described later. If the viewer decides they do not want the item, the viewer selects the "cancel" action button 20.

Figure 5:
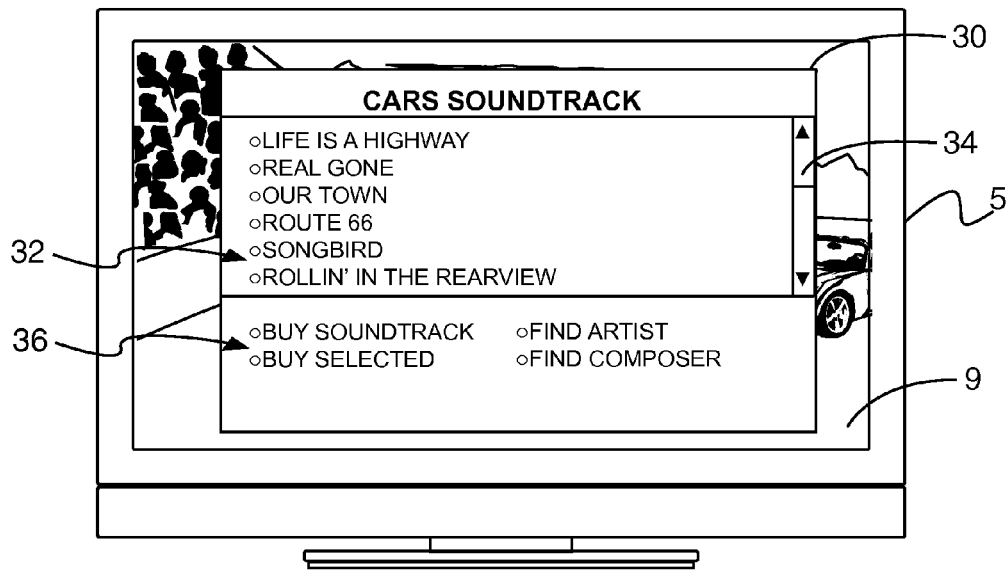
FIG. 5 illustrates a schematic view of a television with a soundtrack purchase menu displayed over the program.
Figure 6:
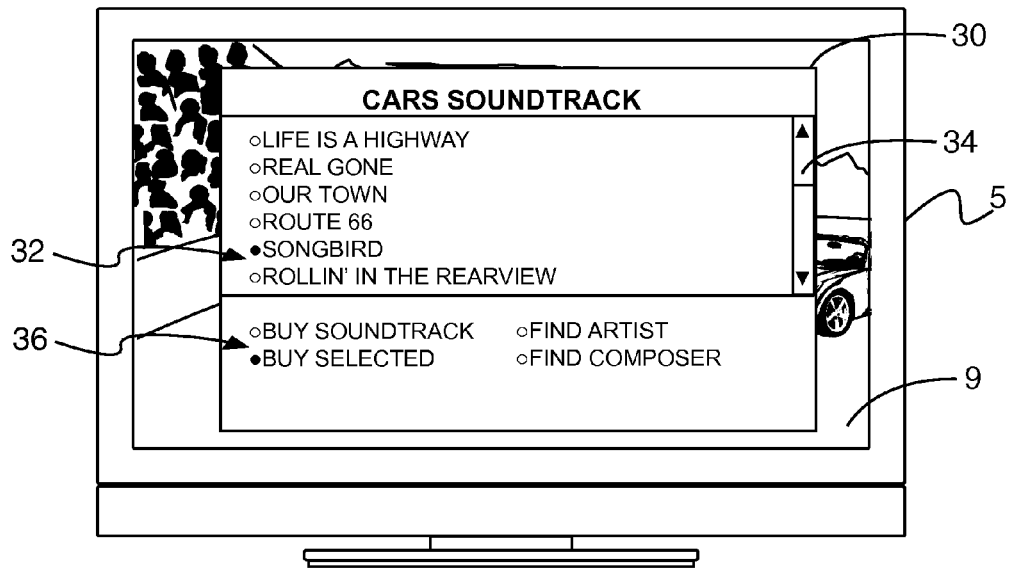
FIG. 6 illustrates a schematic view of a television with a soundtrack purchase menu displayed over the program and a selection made.
Figure 7:
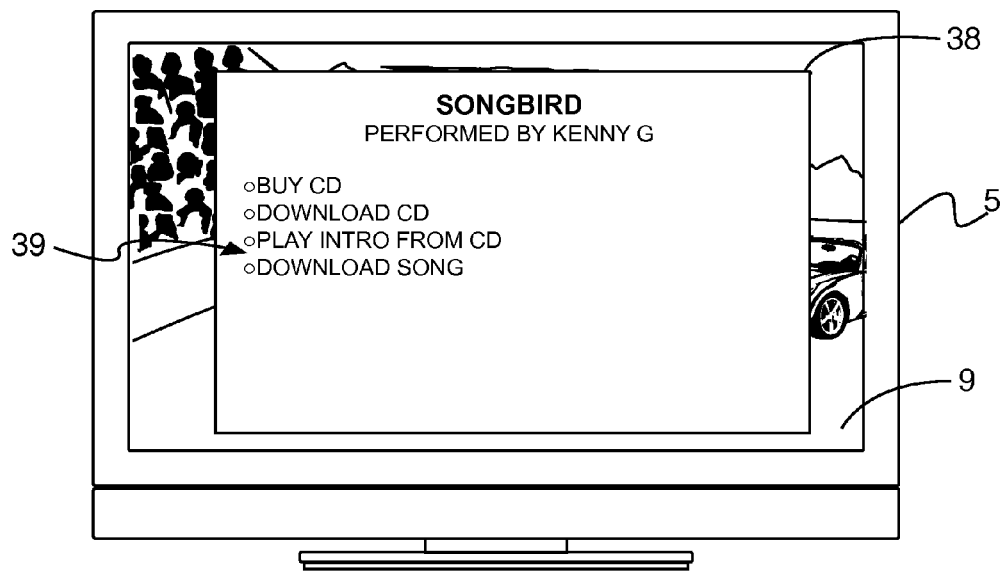
FIG. 7 illustrates a schematic view of a television with a music purchase menu displayed over the program.

Referring to FIGS. 5, 6 and 7, schematic views of a television 5 with a soundtrack purchase menus. This is another example of a user interface. FIG. 5 shows a plurality of selections of songs 32 on the soundtrack of the movie "Cars." In this example, there are more songs 32 then space to display them in the purchase menu 30, so a scroll bar interface 34, for example, is used to scroll through the list of songs 32. There are many user interfaces that provide scrolling or selection of plurality of items, all of which are anticipated and included here within. In this example, there are four action buttons 36 to purchase the entire soundtrack, only the selected songs, to search further for the artist (Kenny G) or to search further for the composer of the selected song and/or soundtrack. Other examples include action buttons to cancel, go back, etc. Again, this is an exemplary user interface and there is no limit to the types, format or content of such search and display user interfaces.

FIG. 6 shows, for example, the viewer has selected one particular song 32, "Songbird" and selected the action button 36 to "buy selected." FIG. 7 shows a purchase menu 38 providing several options 39 such as buying the CD, downloading the CD, playing an introduction to the song (or songs), downloading the song, etc. It is anticipated that to complete the purchase, the viewer either has pre-stored purchase data (as will be described later) or enters purchase data through subsequent user interface menus (as will be described later). The purchase data includes, for example, fund sources (e.g. credit card information, debit card information, Paypal account information, etc) and how to deliver the purchase (e.g. download to music player, ship to address, send by email, etc).

Figure 8:
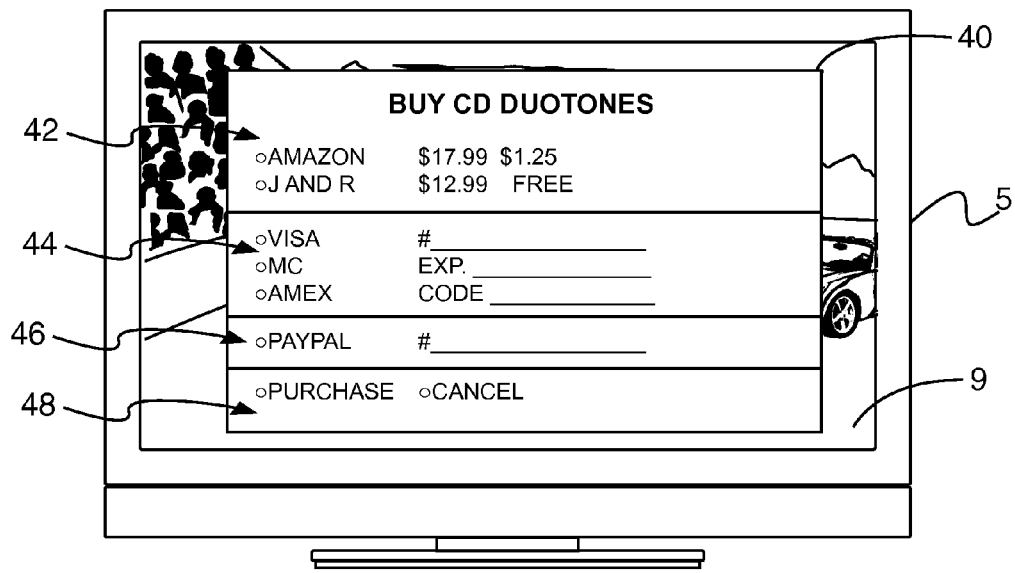
FIG. 8 illustrates a schematic view of a television with a purchase data menu displayed over the program.

Referring to FIG. 8, a schematic view of a television with a purchase data menu 40 displayed over the program 9 is described. In this example, the viewer doesn't have preset account information and needs to provide a means for paying (shown) and address (not shown for brevity purposes). The exemplary menu 40 shows two suppliers 42 of the CD, "Duotones" which contains the song, "Songbird." The viewer selects one supplier to purchase the CD. This exemplary menu 40 presents acceptable payment methods 44/46. It is anticipated that upon selecting one of the suppliers, the acceptable payment methods 44/46 is added or modified (for example, one supplier only accepts VISA). The viewer then selects a payment type 44/46, e.g. AMEX, and enters their credit card number, expiration date, etc. It is also anticipated that, upon selection of the payment type 44/46, in some embodiments, the inputs required for that selection are changed (e.g., a payment type requires the viewer to enter their zip code). Next, the viewer selects the action button 48 for "purchase." If the viewer decides that they do not want to make a purchase, the viewer selects the action button 48 for "cancel." Again, this is an exemplary user interface and many other features and functions are anticipated including, but not limited to, "add to wish-list", "send in email", and "find other suppliers." Also, in some embodiments, more or less information is requested in such menu 40 or subsequent menus (not shown for brevity purposes) including, but not limited to, addresses to ship to, email addresses for confirmations, etc.

Figure 9:
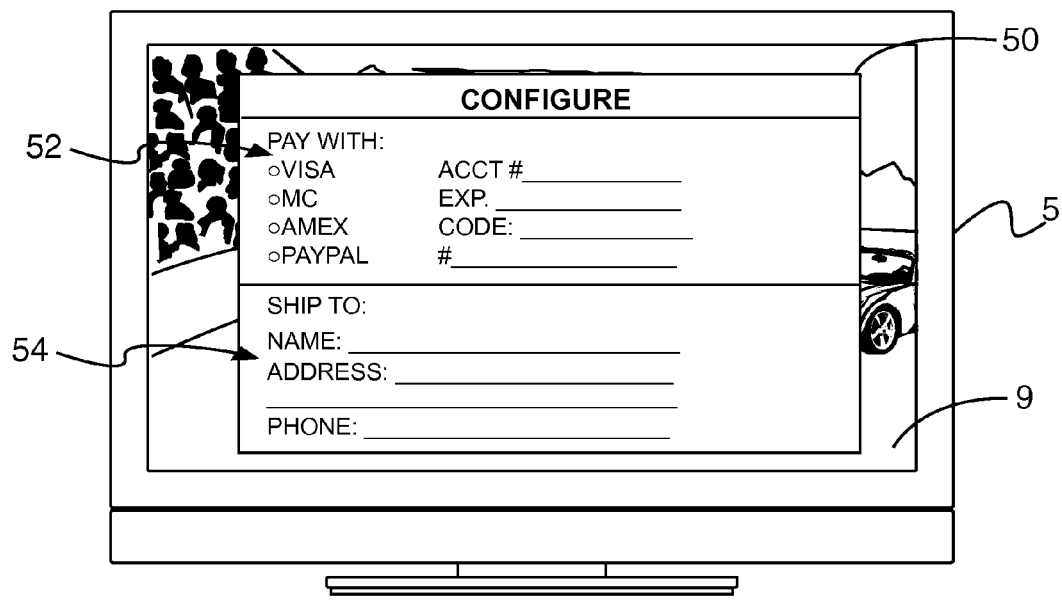
FIG. 9 illustrates a schematic view of a television with a configuration menu displayed over the program.

Referring to FIG. 9, a schematic view of a television with a configuration menu 50 displayed over the program 9 is described. This type of optional user interface 50 is used to configure the television 5 or service with default account information and/or shipping information. For example, once completed, the purchase information from the user interface 50 is stored locally to the television 5 or sent through the network 4 and stored for later access by a server 52. The exemplary menu 50 presents acceptable payment methods 52. The viewer then selects a payment type 52, e.g. AMEX, and enters their credit card number, expiration date, etc. 52. Also, in some embodiments, more or less information is requested in such menu 50 or subsequent menus (not shown for brevity purposes) including, but not limited to, multiple addresses shipping addresses (e.g. one for Mom and Dad, one for Sam, etc), email addresses for confirmations, purchase limits, etc. It is also anticipated that, due to the amount of data being entered, the data is entered by a different device than the television 5 such as a personal computer 8/9 (see FIG. 12) and sent to the television 5 for local storage or stored at a central location 244 associated with an intermediate server 242 (see FIG. 12). With such capabilities, a viewer watching an advertisement for a certain toy by pressing a minimum number of remote control 111 keys, requests the toy to be sent to a relative from a given supplier. In the most streamline embodiment, the viewer has pre-selected one or more suppliers and has provided one or more accounts (e.g. supplier accounts or credit card numbers) and, when watching, for example a movie or commercial, simply presses a "Buy" key on the remote control 111 and the item name (e.g. "Cars") and a default request (e.g. "buy DVD at lowest cost") is performed by the television 5 and/or intermediate server 242, searching each supplier to find a cost for the DVD, selecting the lowest price (optionally the shortest delivery) and placing an order. Therefore, in this embodiment, with the pressing of one remote control 111 key, the viewer has ordered a DVD copy of "Cars" to be mailed to their home.

Figure 10:
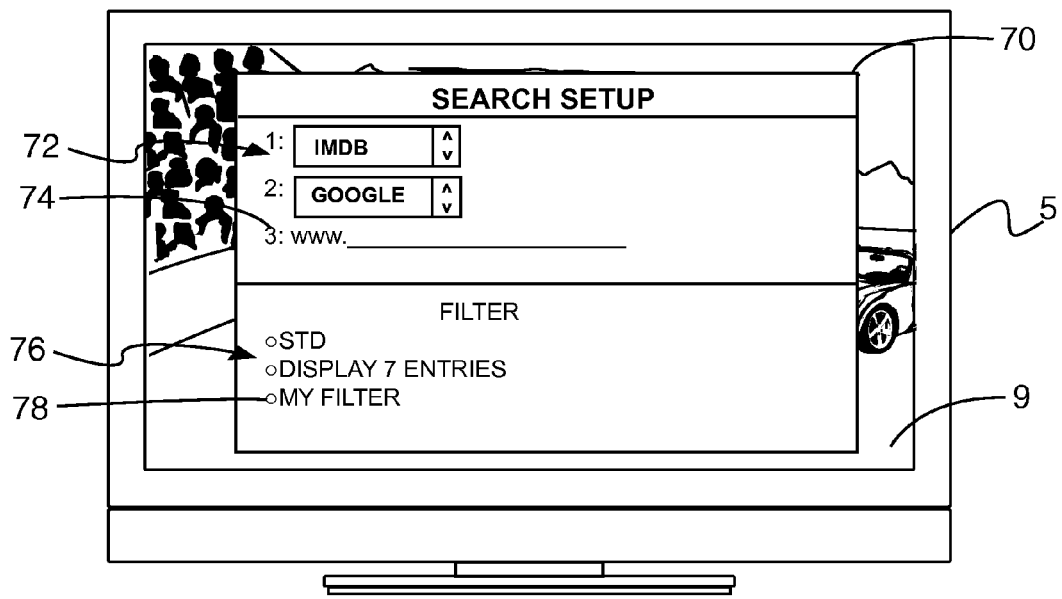
FIG. 10 illustrates a schematic view of a television with a search setup menu displayed over the program.

Referring to FIG. 10, a schematic view of a television with a search setup menu 70 displayed over the program 9 is described. This is a very brief menu 70 that exemplifies one of the many capabilities for customizing a search using an on-screen menu 70. Many other more or less complicated setup user interfaces are anticipated and included here within. It is also anticipated that search setup and filter setup be performed by more robust user interfaces running on servers 52 and/or personal computers 8/9 and stored either local or remote to the television 5.

In this brief example, the search setup menu 70 includes a list of sequences of search engines 72/74 (1, 2 and 3). The first two search engines listed 72 are defaulted to "IMDB" and "GOOGLE" and have arrow bars to scroll up and down in a list of search engines. Such user interfaces are well known and there are many known ways to format, display and provide for selection of a search provider including entering a web address (e.g. URL) as in the third search setup location 74.

Once the search order is setup 72/74, a results filter 76/78 is associated with the search results. For example, a standard filter presents each returned result item as would a typical browser such as Internet Explorer or Fire Fox; a second filter will present only the first seven entries and a third filter 78 will display the entries according to a user created filter 80 (see FIG. 11). There is no limit to the number and types of stored searches 70 and/or search filters 80.

Figure 11:
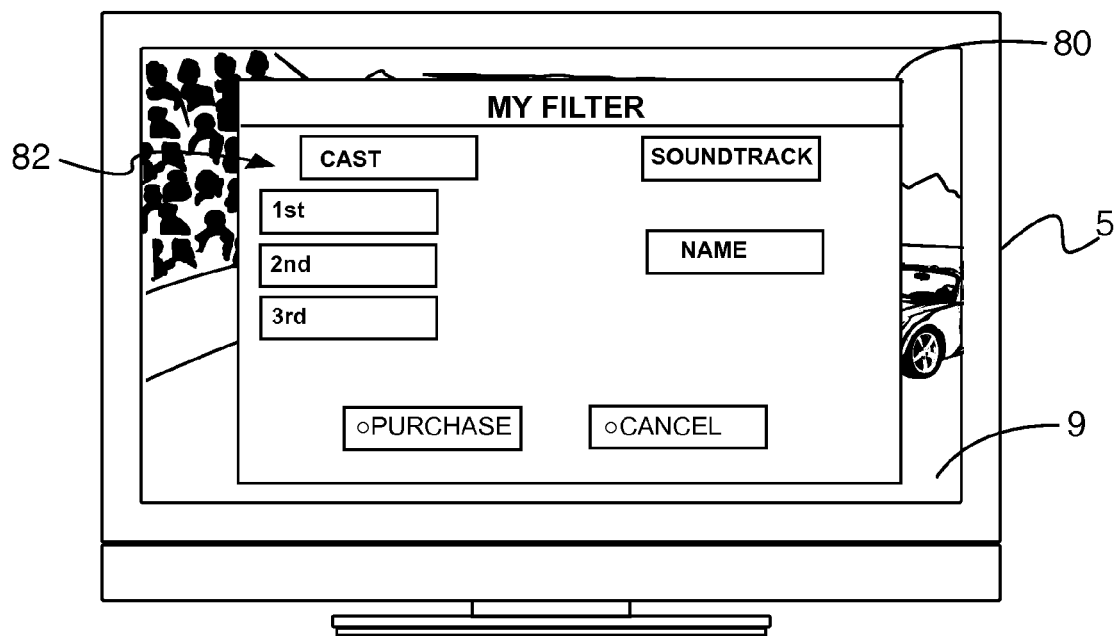
FIG. 11 illustrates a schematic view of a television with a filter setup menu displayed over the program.

Referring to FIG. 11, a schematic view of a television with a filter setup menu 80 displayed over the program 9 is described. This is a very brief menu 80 that exemplifies one of the many capabilities for customizing a search filter using an on-screen menu 80. Many other more or less complicated setup user interfaces are anticipated and included here within. It is also anticipated that search setup and filter setup be performed by more robust user interfaces running on servers and/or personal computers and stored either local or remote to the television 5.

In this example, after a search is performed, the titles "CAST" and "SOUNDTRACK" are displayed and beneath "CAST" are the first three cast members and beneath "SOUNDTRACK" is the name of the soundtrack. At the bottom of the menu are action buttons for "PURCHASE" and "CANCEL" 82. This is a very brief example. It is anticipated that the user interface provides for addition/deletion of various elements, placement of the elements, formatting, etc as known in the art of creation of a user interface. For example, the heading "CAST" is highlighted using the select feature of a remote control 111 and then moved using the arrow buttons of the remote control 111, etc. Alternately, the filter is created remote from the television 5, for example on a personal computer 8/9.

Figure 12:
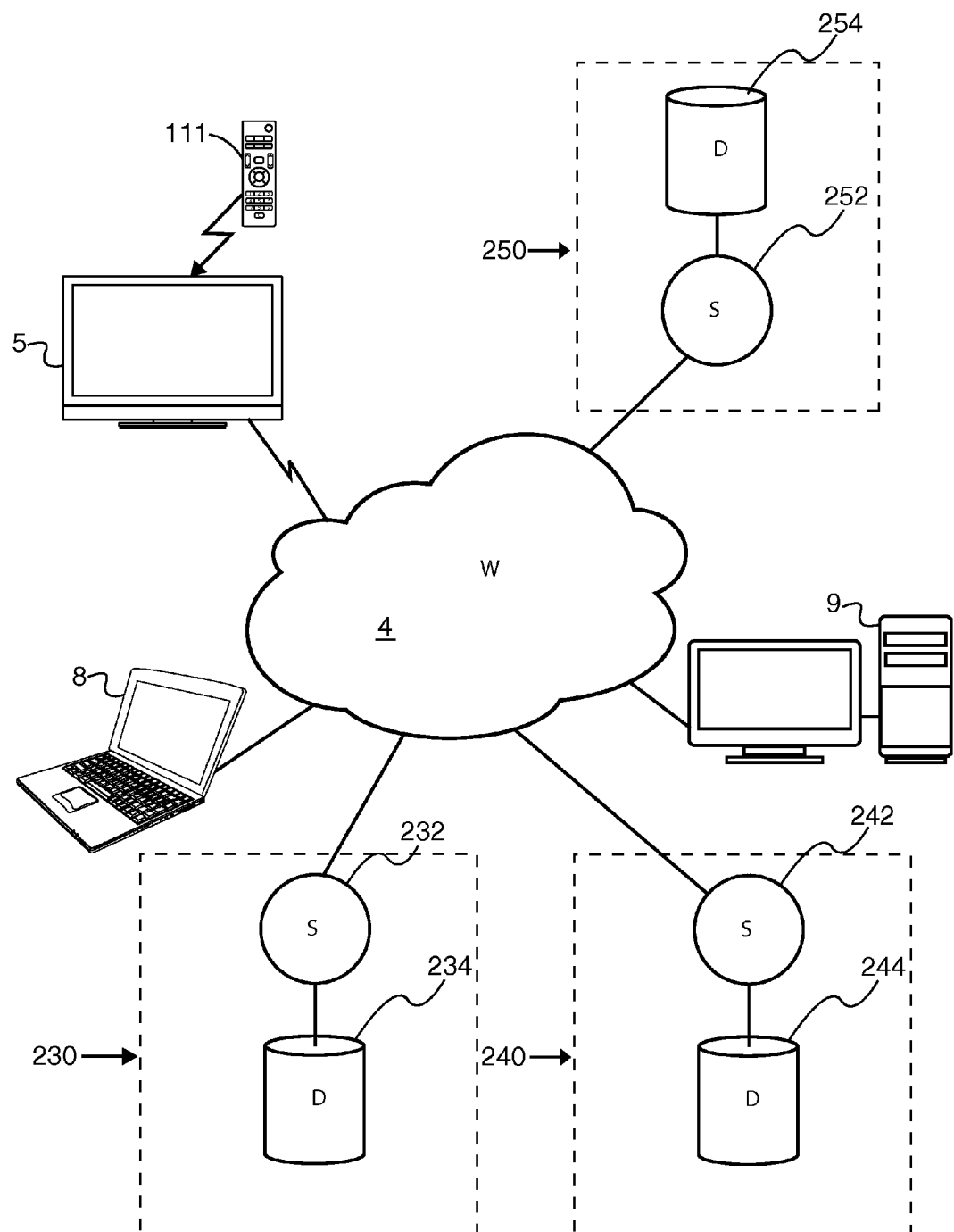
FIG. 12 illustrates a block diagram of a typical television system interfaced through a network to various search engines.

Referring to FIG. 12, a block diagram of a typical television 5 system interfaced through a network to various search engines is described. The television 5 is shown with a wireless remote control 111 (e.g. infrared or radio frequency) and is connected to a network 4, for example the Internet 4, through any known network interface including, but not limited to, Ethernet (e.g. 802.3), WiFi (e.g 802.11), wireless adapters/routers, routers, bridges, phone lines, cable, fiber optics, etc. Likewise, other computers 8/9 are also connected to the network 4 through similar networking infrastructures. One or more servers 232/242/252 are also connected to the network/Internet 4 as known in the industry and the devices 5/8/9/232/242/252 on the network/Internet 4 have addresses (e.g. MAC addresses URLs, etc) for addressing connections and data packets to the desired device 5/8/9/232/242/252.

Either automatically (e.g. each time a program changes) or under viewer control (e.g. after activation of a function using the remote control 111), the television 5 sends a search query to one or more servers 232/242/252 through the network/Internet 4 as known in the industry and the servers 232/242/252 query their local data 234/244/254 or remote data 234/244/254 to find information about one or more search terms from the search query. Results from the search are sent back to the television 5 through the network/Internet 4 where the results are, for example, filtered, formatted and displayed on the display 7 (see FIG. 13) of the television 5.

In some embodiments, the search query including metadata and optionally stored data from the television 5 is sent without viewer interaction and displayed on the display 7 according to preset directives. For example, a viewer configures his/her television 5 to search for the release date and primary cast members each time a movie is viewed and displays the resulting information in a banner at the bottom of the display 7. As an example of this, each time the current program changes, the metadata is analyzed to prepare a search query, the search query is sent to one or more search engines 232/242/252, search results are returned to the television 5 and displayed as a banner or overlay at the bottom of the display 7 without requiring further action from the viewer.

In another mode of operation, due to the complexity of preparing meaningful search queries, extracting results and formatting the results properly for a display 7, an intermediate server 242 is provided. In this embodiment, the viewer user, for example, a personal computer 8/9 to create a profile on the intermediate server 242 stored, for example, local to the server 242 in a database 244. The user profile includes, for example, an identification of the television 5 (e.g. MAC address, user name & password, URL, etc), search templates, search result filters, search result formatting templates, etc. Once created, the television 5 sends search requests to the intermediate server 242 and the intermediate server 242 utilizes the search templates to query local data 244 and/or send search requests to search engines 232/252 then receives search results, filters the results using search filters from the search result filters and formats the results using the search result formatting, creating a formatted result which is sent back to the television 5 and displayed. Many combinations and distributions of functionality between the search engines 230/250, intermediate servers 240, personal computers 8/9 and televisions 5 are anticipated, all of which are included here within.

Figure 13:
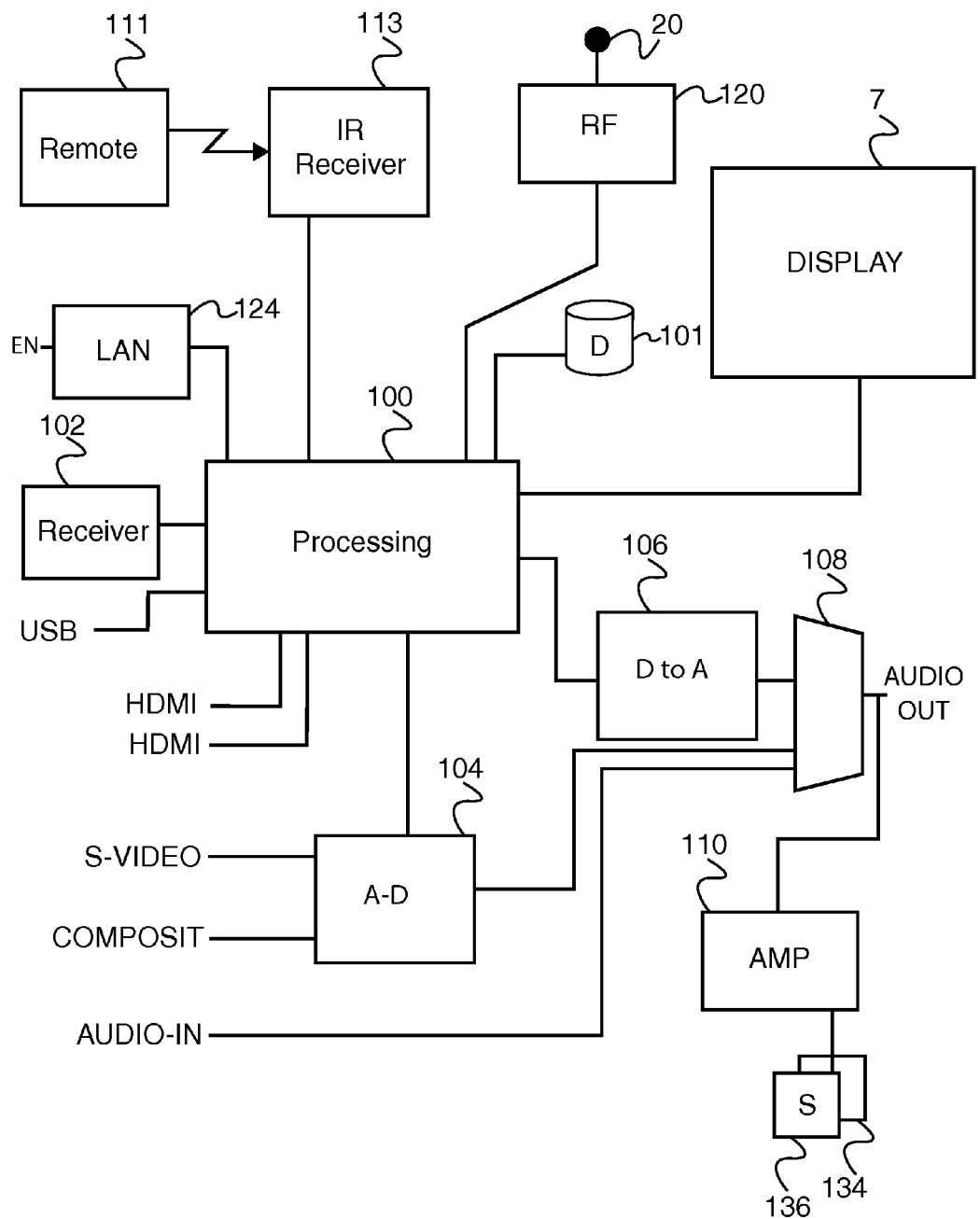
FIG. 13 illustrates a block diagram of a typical television system.

Referring to FIG. 13, a schematic view of exemplary televisions 5 is described. This figure is intended as a representative schematic of a typical monitor/television 5 and in practice, some elements are not present in some monitors/televisions 5 and/or additional elements are present in some monitors/televisions 5 as known in the industry. In this example, a display panel 7 for content is connected to a processing element 100. The display panel 7 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High Definition Multimedia Interface (HDMI 1-4), USB ports and an analog-to-digital converter 104. The analog-to-digital converter 104 accepts analog inputs from legacy video sources such as S-Video and Composite video and converts the analog video signal into a digital video signal before passing it to the processing element. At least one of the video inputs has provisions to include metadata either embedded in the video data or provided in alternate input channels or any way known in the industry. For example, metadata is received by the processing element 100 of the television 5 in packets within digital data.

In embodiments in which profile information 208 and/or templates 202/204/206 (see FIG. 14) are stored locally to the television 5, local storage 101 is provided such as a hard disk or flash memory.

The processing element 100 accepts video inputs and audio inputs selectively from a variety of sources including an internal television broadcast receiver 102, High Definition Multimedia Interface (HDMI), USB ports and an analog-to-digital converter 104. The analog-to-digital converter 104 accepts analog inputs from legacy video sources such as S-Video and Composite video and converts the analog video signal into a digital video signal before passing it to the processing element 100. The processing element 100 controls the display of the video on the display panel 7.

Audio emanates from either the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 134/136.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or two way.

In a preferred embodiment, the television 5 connects to the network/Internet 4 through a wireless network interface 120 having an antenna 20 or a local area network using a local area network adapter 124 for connecting to, for example, an Ethernet local area network or a power line local area network, as known in the industry. Any known network connection is anticipated. The processor 100 communicates to the Internet-based service (e.g. servers 232/242/252) through the wireless network interface 120 or the local area network 124.

Figure 14:
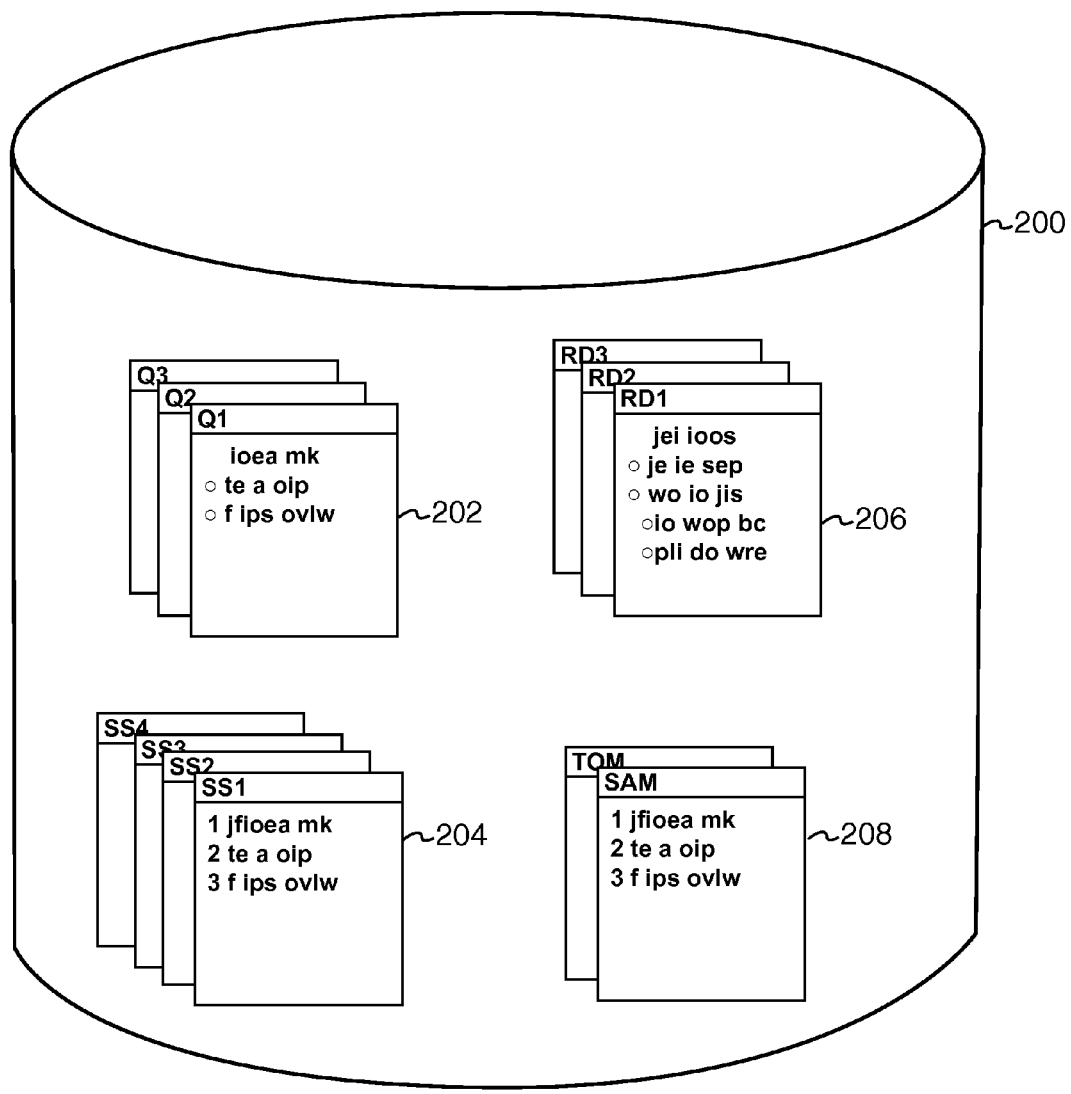
FIG. 14 illustrates a block diagram of a typical data arrangement.

Referring to FIG. 14, a block diagram of a typical data arrangement 200 is described. This is an exemplary arrangement 200 of templates and relationships between templates that are used by the processing element 100 and/or the intermediate server 242 to prepare search queries, filter search results, format search results, etc. Any other data structure and relationship between elements of the data structure is anticipated, all of which are included here within.

In this example, one or more search query templates 202 are shown. It is anticipated that the search query templates 202 are, for example, either pre-programmed (e.g. programmed by the manufacturer of the television 5), programmed by the viewer through an on-screen user interface, programmed by the viewer (or a third party) through a personal computer and transferred to the television 5 or intermediate server 242, programmed by the viewer (or a third party) through a personal computer and transferred to the intermediate server 242, etc. The search query templates 202, for example, contain directives regarding the integration of metadata with optional viewer data to formulate the search query, directives on which search engines to engage, error strategy, timeout strategy, etc. For example, one search query templates 202 includes: ("movie title metadata.title") which will extract a title from the metadata and append it to the words "movie title" for subsequent transmission. It is anticipated that, in some embodiments, the search query templates 202 will have a name such as "GET CAST" so that activation of a function of the remote control 111 will result in the presentation of a menu containing one or more possible search query templates 202 by name. Therefore, if the viewer is watching "Cars" and presses the "search menu" function on their remote control, a menu containing "GET CAST" appears and, upon selection of "GET CAST" the search query templates 202 titled "GET CAST" is used to format the search query for "movie title Cars".

Further, in this example, one or more search query send templates 204 are shown. It is anticipated that the search query send templates 204 are, for example, pre-programmed (e.g. programmed by the manufacturer of the television 5), programmed by the viewer through an on-screen user interface, programmed by the viewer (or a third party) through a personal computer and transferred to the television 5, programmed by the viewer (or a third party) through a personal computer and transferred to the intermediate server 242, etc.

The search query send templates 204, for example, contain directives regarding transmission of the search query to one or more search servers 232/242/252, timeout strategy, etc. For example, one search query send templates 204 includes: ("send to IMDB, timeout=1 minute, error=display nothing") which directs the processor 100 to send the search query (e.g. "movie title Cars") to the IMDB web site, wait at most 1 minute for results and if no results are returned or another error occurs, do nothing. It is anticipated that this search query send templates 204 will have a link to one or more search query templates such as the "GET CAST". Therefore, after the viewer is watching "Cars" presses the Search function on their remote control, and selects the menu item "GET CAST", the search query templates 202 titled "GET CAST" is used to create the query "movie title Cars" and the query is sent to the IMDB. Note, IMDB is, for example, a web address, URL, MAC address or any other known method of addressing a network/Internet server 232/242/252 such as the Internet Movie Database.

Once data is received from the server 232/242/252 (IMDB in this example), the results need to be displayed, for example as shown in FIG. 2. Many network/Internet servers 232/242/252 send results as, for example, HTML or XML for display within a browser of a computer 8/9. In one scenario, the processor 100 implements sufficient browser functionality as to display the, results (e.g. HTML or XML) on the display 7 in a meaningful way using the remote control 111 to maneuver through the results (e.g. page up/down, scroll, select, etc). Alternately, a search result display template 206 is used to format the search results as shown, for example, in FIG. 2, etc. In this, a search result display template 206 is created to parse the, for example HTML or XML search results and extract the meaningful information (e.g. names of cast members) and properly format the extracted information for the television display 7. It is anticipated that the search result display templates 206 be associated with, for example, any of a particular search query template 202, search query send template 204 or one or more search servers 232/242/252 such as the IMDB. It is anticipated that the search results display templates 206 are, for example, pre-programmed (e.g. programmed by the manufacturer of the television 5), programmed by the viewer through an on-screen user interface, programmed by the viewer (or a third party) through a personal computer and transferred to the television 5, programmed by the viewer (or a third party) through a personal computer and transferred to the intermediate server 242, etc.

In some embodiments, one or more viewer profiles 208 are also created or provided. It is anticipated that in some embodiments the profiles 208 are pre-programmed (e.g. programmed by the manufacturer of the television 5), programmed by the viewer through an on-screen user interface, programmed by the viewer (or a third party) through a personal computer and transferred to the television 5, programmed by the viewer (or a third party) through a personal computer and transferred to the intermediate server 242, etc. The profiles 208 contain information pertaining to one or more viewers (it is anticipated that a television 5 is shared between multiple viewers in, for example, a home). A profile 208 contains, for example, information such as which search query templates 202, search query send templates 204, search result format templates 206, etc, are active for each viewer. In some embodiments, the profile 208 contains credentials used to access certain servers 232/242/252. For example, if the search engine 232/242/252 is "Consumer Reports", a viewer must be a subscriber of "Consumer Reports" to search current/back issues to find, for example, rating for an automobile being shown in a commercial being viewed. In this example, the profile 208 contains a user name and password of the viewer for "Consumer Reports." It is anticipated that other viewer data is stored in the profile 208 for that viewer.

Figure 15:
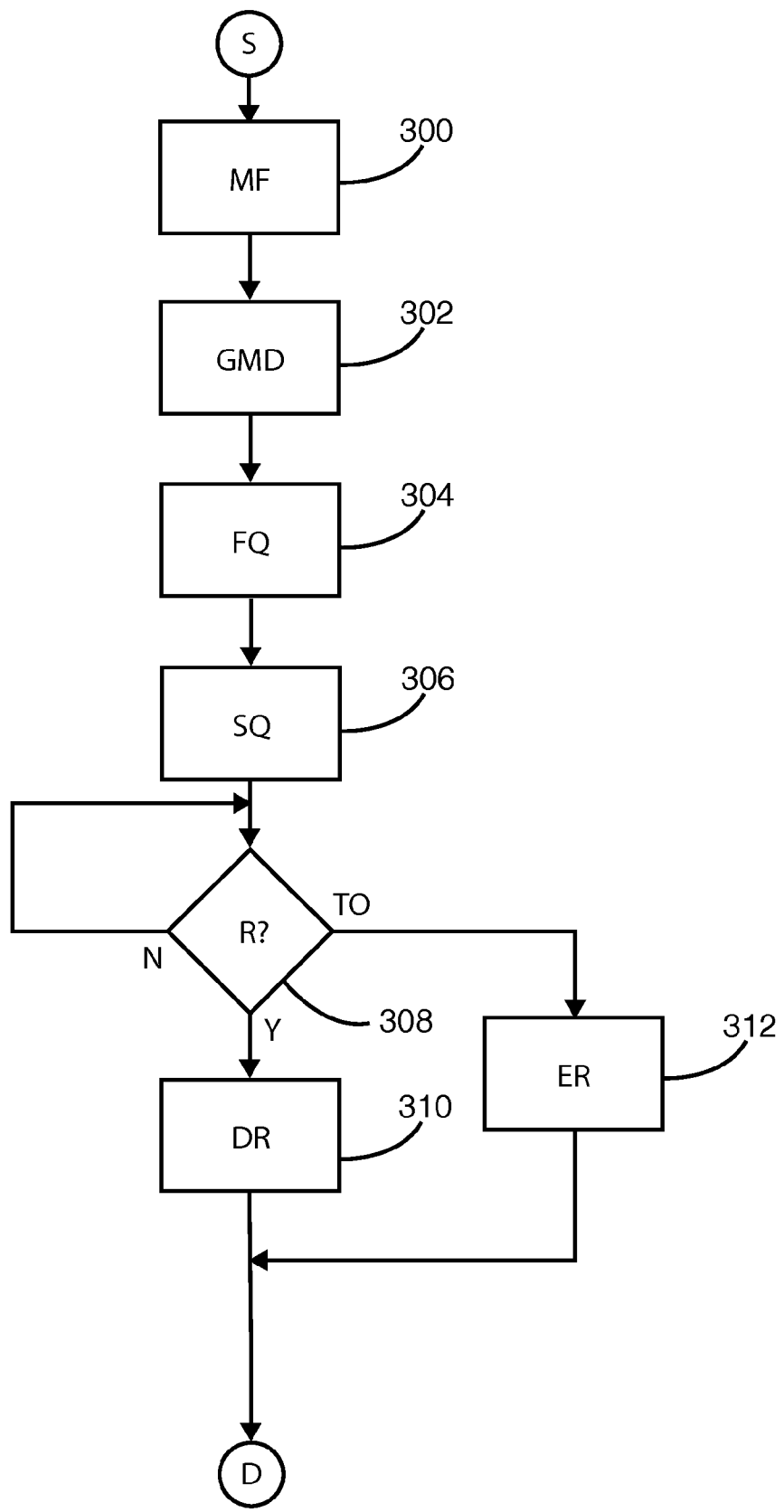
FIG. 15 illustrates a flow chart running within the television.

Referring to FIG. 15, a flow chart running within the television 5 is described. This program flow is an example of integrating metadata with a search query at the processor 100 of the television 5. It starts when the viewer selects 300, for example, the Metadata Search Function on, for example, a remote control 111. Next, the needed metadata is extracted 302 from the current (or prior) video stream (e.g. "Cars" and a query is formatted 304 (e.g. "movie title cars"), for example using a search query templates 202. Next the query is sent 306 to one or more search engines 230/240/250 and a time is taken to wait for results 308. In some embodiments, the search strategy (e.g. search engines 230/240/250, order, error strategy, timeout strategy, etc) is determined using a search query send template 204. If no results are returned within the expected time, an error routine is run 312 (e.g. a message is displayed for a short period of time, etc). If results are returned, the results are displayed 310, for example using a search result display template 206.

Figure 16:
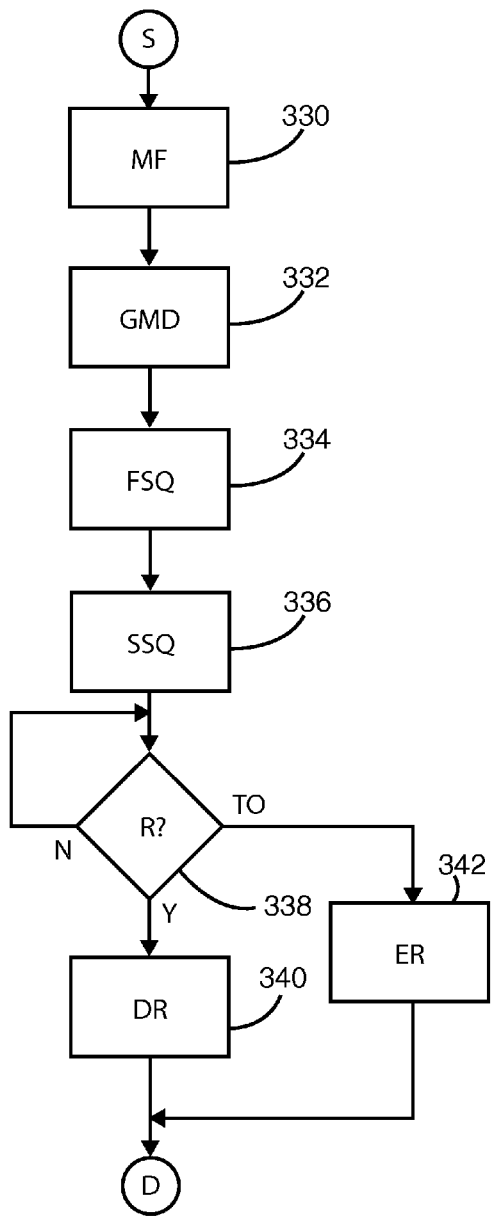
FIG. 16 illustrates a second flow chart running within the television.

Referring to FIG. 16, a second flow chart running within the television 5 is described. This program flow is an example of integrating metadata with a search query at the processor 100 of the television 5 and sending a sub-query to an intermediate server 242. It starts when the viewer selects 330, for example, the Metadata Search Function using, for example, a remote control 111. Next, the needed metadata is extracted 332 from the current (or prior) video stream (e.g. "Cars") and a sub-query is formed 334 (e.g. "movie title Cars"). Although in some embodiments, the sub query is in text form (e.g. "movie title Cars"), the sub query need not be in text form since, in some embodiments, a proprietary protocol is anticipated such as embedding the search terms in, for example, Extensible Markup Language (XML). Next the query is sent 336 to an intermediate server 242 and a time is taken to wait for results 338. If no results are returned within the expected time, an error routine is run 342 (e.g. a message is displayed for a short period of time, etc). If results are returned, the results are displayed 340, for example using a search result display template 206.

Figure 17:
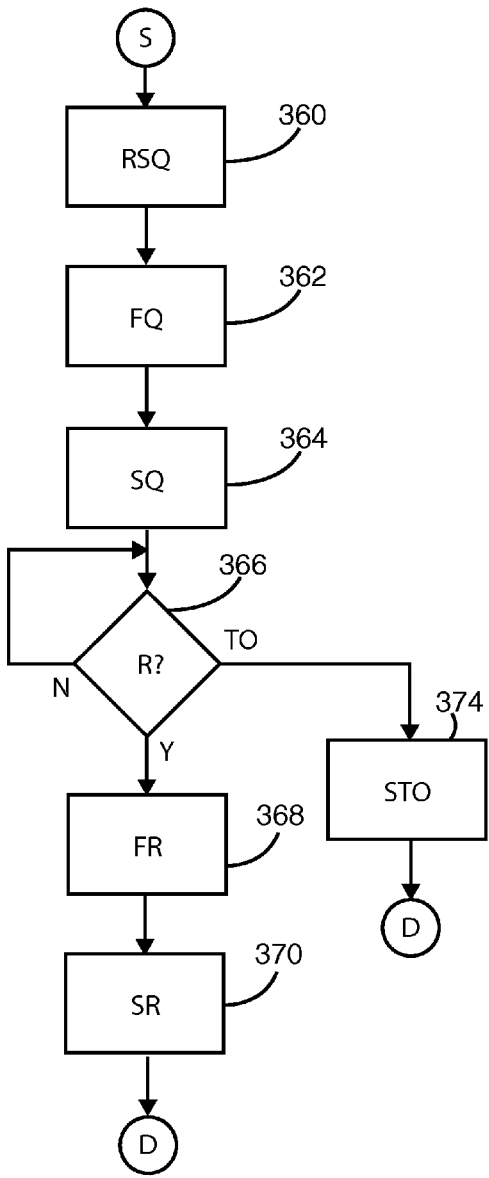
FIG. 17 illustrates a flow chart running within the intermediate server.

Referring to FIG. 17, a third flow chart running within the intermediate server 242 is described. This program flow is an example of one exemplary operation of the intermediate server 242. It starts when the intermediate server 242 receives 360 a sub-query from a television 5. For example, the intermediate server 242 receives an XML message containing a sub-query to get information about "Cars". Next, a query is formatted from the sub query 362 and is sent 364 to one or more search engine servers 232/252 or, alternately, is also anticipated that some or all of the search query results be extracted from a local database 244 or a local cache 244. If no results are returned 366 within the expected time, an error message 374 is sent to the television 5. If results are returned 366, the results are formatted 368, for example using a search result display template 206. Next the search results are sent 370 back to the television 5. In some embodiments, the intermediate server 242 uses a search query send template 204 to determined, for example, which search engines 232/252, the order of searching, error strategies, timeout strategies, etc.

Figure 18:
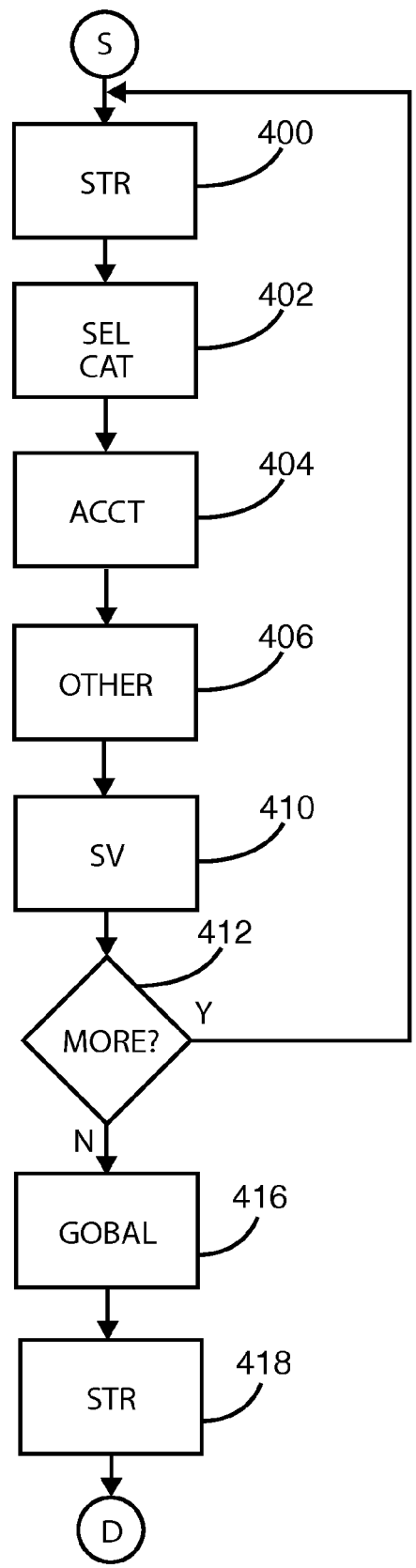
FIG. 18 illustrates a first flow chart of "one remote control button shopping."

Referring to FIG. 18, a first flow chart of "one remote control button shopping" is described. This is an exemplary program flow related to capturing a viewer's preferences such as favorite on-line stores (e.g. URLs), categories of goods in which the viewer is interested, maximum price levels, account information, email addresses, selection criteria (e.g. lowest cost), credit card information, shipping information, format choices (e.g. DVD, VHS, Blu-ray) etc. The data will be used later when the viewer initiates a "one button shopping" experience. Being that there are many conceivable varieties of information related to on-line purchasing, the information obtained in the flow of FIG. 18 is a greatly simplified set of information. Additionally, any order of information gathering is anticipated as well as an initial information gathering and later additions, deletions and changes through editing interfaces, as known in the industry.

It is anticipated that, in some embodiments, the viewer is presented with a purchase price or estimated purchase price before making the purchase. For example, after the viewer begins to view a movie trailer, the price is presented in the lower right corner of the display 7 (e.g., "Buy Now for $19.95"). In some embodiments, the price is presented after the buy function is executed (e.g., "Press Buy again, price is $19.95") and a second buy function is required to complete the purchase. In some embodiments, the price is already part of the main content, for example, when the content is an advertisement and a price is displayed within the advertisement (e.g. "To purchase a one-year subscription to Time-Life, send in your check or money order for $39.95 . . . ."

In order to provide "one button shopping," the system populates a configuration file 101 with purchasing data that enables on-line shopping at one or more on-line store. Thereafter, upon access of a function (e.g. remote control key or key sequence), a currently viewed product is automatically purchased from one of the on-line stores without further interaction of the viewer. As an example, the viewer is watching a commercial for an exercise video, presses the "buy" key of the remote control 111 and the processing element 100 negotiates with the on-line store(s) to buy the exercise video. In some embodiments, the product name is extracted from the metadata (e.g. Master Exercise Video). In some embodiments, both the product name and on-line store is extracted from the metadata (e.g. Master Exercise Video, master.exercise.com). In addition, in some embodiments, other information is extracted such as the type or category of the product (e.g. DVD video, vehicle, clothing), product formats/colors available (e.g. DVD, VHS, "Red," "Blue," etc), etc. It is anticipated that, when multiple colors, formats, or other selections of the product are available and the viewer hasn't pre-made a "favorite" selection (e.g. DVD), the one-button buy system presents a selection menu, requiring the viewer to select the particular type, format, color, version, etc.

The exemplary flow begins with a setup menu invoked through the menu system of the television 5, as known in the industry. For example, the viewer presses a menu key on the remote control 111. The system presents a series of menus and prompts to obtain default information regarding one or more on-line stores and/or preferences of the viewer. To start, the viewer is requested to enter a store 400 (see FIG. 20). For example, the viewer is requested to enter a name (e.g. Amazon or Barnes and Noble) and a web address (e.g. a URL). Next, the viewer is requested to enter one or more categories 402 (see FIG. 21) for the on-line store such as, movies, music, books, groceries, clothing, all, etc. It is anticipated that, in one embodiment, the viewer selects one or more categories 402 from a check list or radio-button list. The "all" selection indicates that the current on-line store is to be searched for all potential purchases. Next, the viewer is prompted for and enters account information 404 (see FIG. 22) for that store and/or credit card information that will be used to purchase from that store. For example, if the store is Amazon and the viewer has an account and password for Amazon, the user enters such. Alternately, the user enters a credit card or paypal number and authorization information that will be used for any transactions with that on-line store. Next, the viewer is prompted for and enters other information 406 related to that on-line store such as maximum price for any product purchased at that store, preferred shipping information, format preference, etc. Next, the information regarding the current on-line store is saved 410. Next, the viewer is asked if they want to enter more on-line stores 412 and, if so, the above steps are repeated, otherwise, the viewer is requested to enter 416 one or more global items such as media format (e.g. DVD, VHS, Blu-ray, CD, MP3, WMA, etc), maximum spending per time period (e.g. $200 per month), etc. Once finished, the data is stored and the menus are closed 418 and the flow ends.

Figure 19:
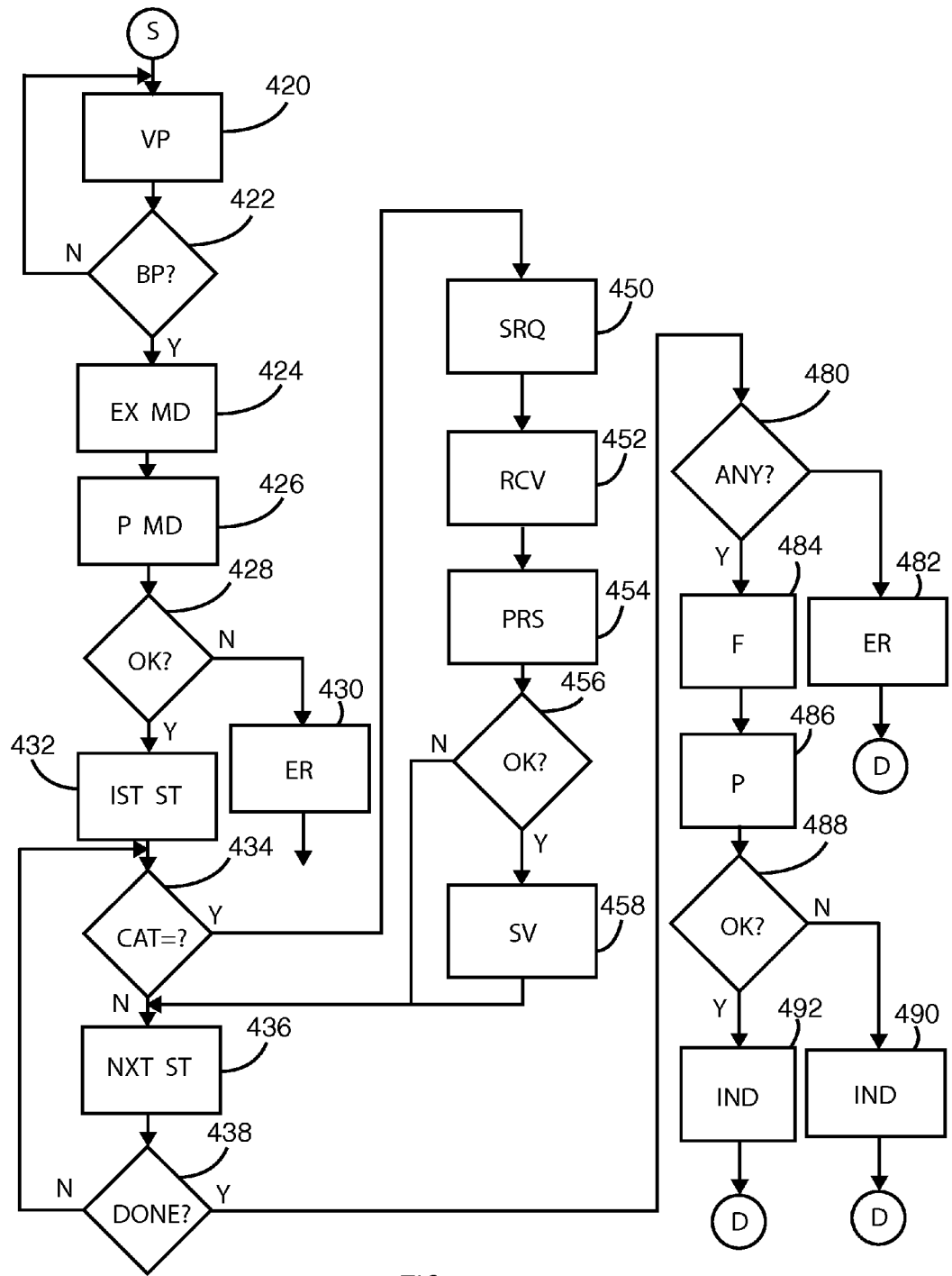
FIG. 19 illustrates a first flow chart of "one remote control button shopping."

Referring to FIG. 19, a second flow chart of "one remote control button shopping" is described. This too is an exemplary program flow related to providing a "one remote control button shopping" feature to a viewer, using the purchase preferences captured as in FIG. 18. The preferences such as favorite on-line stores (e.g. URLs), categories of goods in which the viewer is interested, maximum price levels, account information, email addresses, selection criteria (e.g. lowest cost), credit card information, shipping information, format choices (e.g. DVD, VHS, Blu-ray) etc. were previously entered by the user and, upon execution of the "buy" function, the stored information is used to make a purchase. Being that there are many conceivable varieties of information related to automated purchasing, the flow of FIG. 19 is a greatly simplified for brevity reasons. Additionally, any order of operation is anticipated including alternate status indicators such as colored icons displayed on the display 7, color change of device logos, indicator lamps, etc.

The flow begins with a viewer watching a program or content 420. If the "buy" function isn't initiated 422, viewing continues. If the "buy" function is initiated 422 (e.g. the "buy" button 112 on the remote control 111 is pressed), metadata from the current program is extracted 424 and parsed 426 to determine, for example, the category of product and the name of the product being viewed in the current content/program. For example, if the viewer is watching a preview for the movie "Cars," the category is movie. Likewise, if the viewer is watching an advertisement for a music collection, the category is music, etc. If sufficient metadata is not available 428, then an error handler 430 runs, for example displaying a red icon on the display 7 or presenting a pop-up menu requesting the viewer enter some or all information. For example, if the title of the movie isn't available in the metadata, a prompt menu is displayed requesting that the viewer enter the title using, for example, the remote control 111. In some embodiments, if the category cannot be determined 428, the category is marked as "all" meaning that all registered on-line stores are searched for the product.

It is anticipated that, in some embodiments, the viewer is presented with a purchase price or estimated purchase price before making the purchase. For example, after the viewer begins to view a movie trailer, the price is presented in the lower right corner of the display 7 (e.g., "Buy Now for $19.95"). In some embodiments, the price is presented after the buy function is executed (e.g., "Press Buy again, price is $19.95") and a second buy function is required to complete the purchase. In some embodiments, the price is already part of the main content, for example, when the content is an advertisement and a price is displayed within the advertisement (e.g. "To purchase a one-year subscription to Time-Life, send in your check or money order for $39.95 . . . ."

Next, a first store of the registered on-line stores is selected 432 and it the data for that store is checked 434 to see if that store relates to the category. If the current store does not match the category 434, the next store is selected 436 and if there are more stores 438, the previous steps are run to check the category with the remaining stores.

If the current store matches the category 434, a request is sent 450 to the store to find the product (e.g. the processor accesses the web page associated with the store, finds the search box, enters the product name and, selects "GO"). The results are received 452 and parsed 454 to find the exact product title and price. If the parsing fails to find the product and price 456 (e.g. the current store doesn't have that particular product), that store is skipped and the subsequent stores are checked as above. If the parsing succeeds 456 and a valid price is found, the results are saved 458 for future use and the subsequent stores are checked as above.

Once all stores are checked 438, the saved data is searched to see if any stores had the product 480. If not, an error indicator is made 482 such as a colored icon or audible tone. If one or more stores had the product 480, the saved data is searched to find the best purchase 484, for example, the lowest price, fastest delivery or preferred store. The selected on-line store is then accessed to purchase 486 the product. If the purchase is successful 488, an indicator is presented 492 such as a green-colored icon or pleasant audible tone. If the purchase is not successful 488, a different indicator is presented 490 such as a red-colored icon or unpleasant audible tone.

Figure 20:
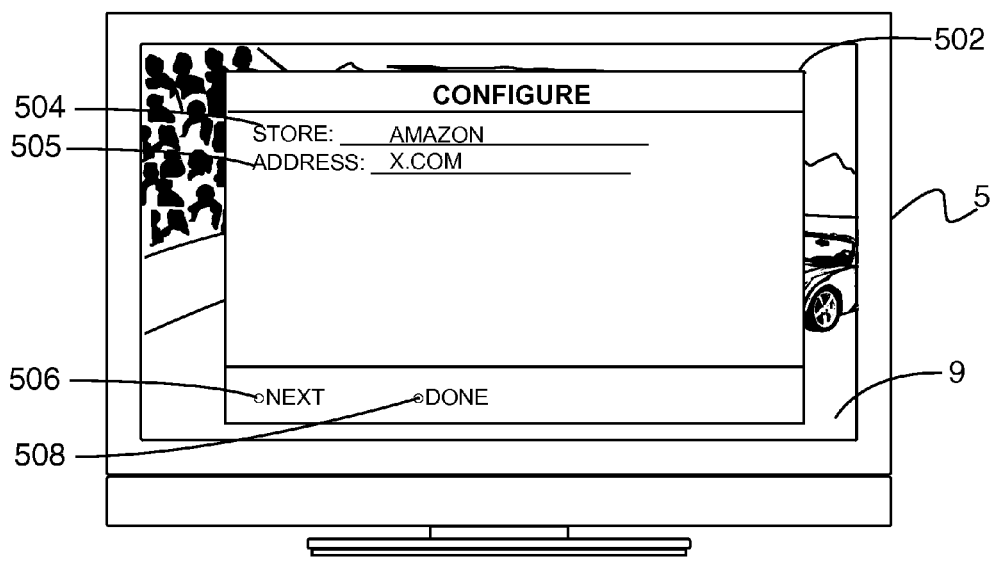
FIG. 20 illustrates an exemplary "one button purchase" setup user interface.

Referring to FIG. 20, an exemplary "one button purchase" setup user interface is described. This exemplary user interface 502 requests the viewer enter a store name 504 (e.g. Amazon) and store address 505 (e.g. URL of Amazon) then selects "next" 506 to proceed and enter more information about the store or "done" 508 when the viewer is finished entering store information.

Figure 21:
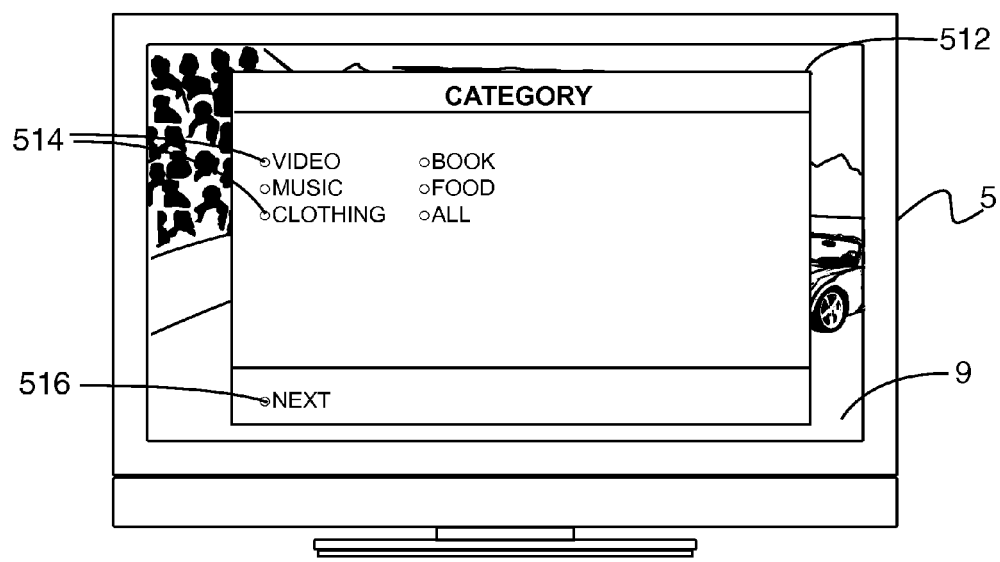
FIG. 21 illustrates a second exemplary "one button purchase" setup user interface.

Referring to FIG. 21, a second exemplary "one button purchase" setup user interface is described. This exemplary user interface 512 requests the viewer enter a category for the store (e.g. Amazon). For example, the viewer selects one or more categories 514 such as video and clothing (e.g. the store entered 504 sells both video and clothing) and then selects "next" 516 to proceed and enter more information about the store.

Figure 22:
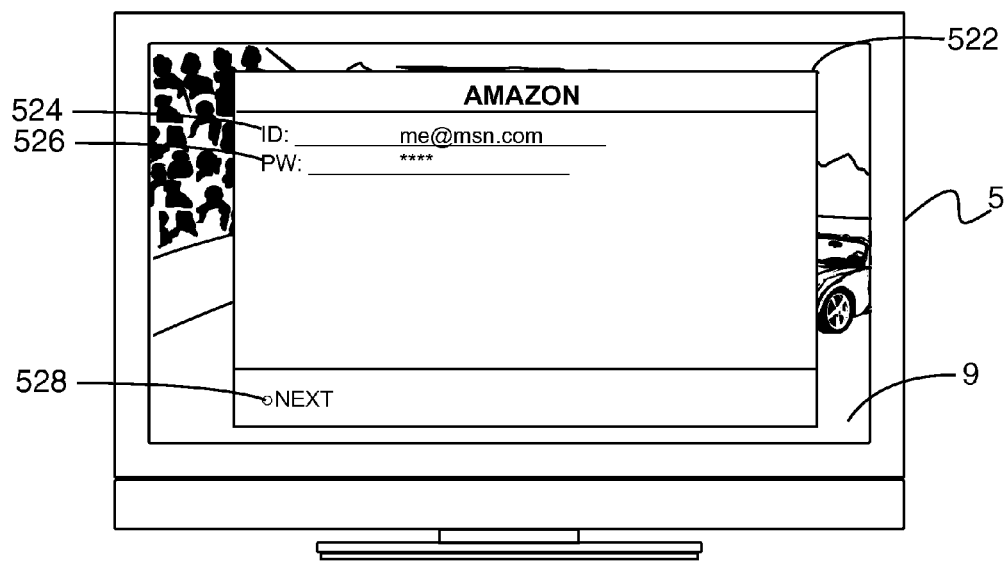
FIG. 22 illustrates a third exemplary "one button purchase" setup user interface.

Referring to FIG. 22, a third exemplary "one button purchase" setup user interface is described. This exemplary user interface 522 requests the viewer enter a user name 524 and password 526 used to access the store (e.g. Amazon). For example, the viewer enters their user identification 524/526 such as an email address 524 associated with an account and a password 526 and then selects "next" 528 to proceed and enter more information about the store. This is an example and it is anticipated that other account information and/or credit card or Paypay information is entered on a setup user interface as known in the industry.

Figure 23:
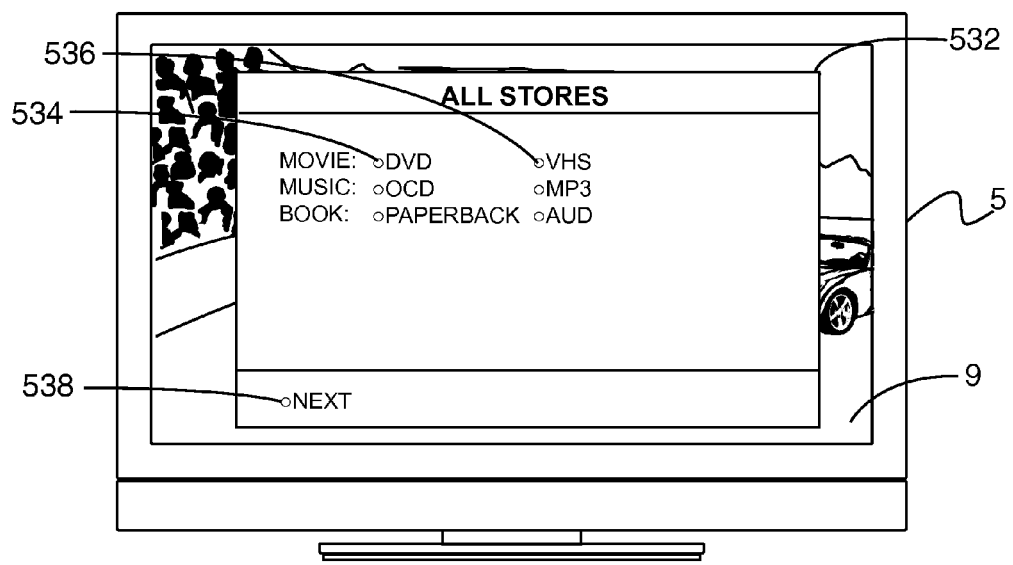
FIG. 23 illustrates a fourth exemplary "one button purchase" setup user interface.

Referring to FIG. 23, a fourth exemplary "one button purchase" setup user interface is described. This exemplary user interface 532 prompts the viewer to enter global selections for all stores such as movie format (e.g. DVD 534 or VHS 536), music format (CD, MP3, WMA, etc), book format, color preference, etc. For example, the viewer selects one or more formats 534/536 and then selects "next" 538 to proceed and enter more information about the store.

Figure 24:
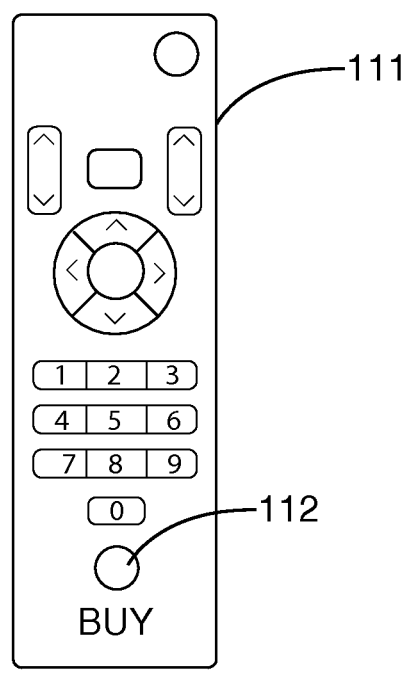
FIG. 24 illustrates an exemplary remote control.

Referring to FIG. 24, an exemplary remote control 111 is described. Although there are many ways known to implement a "one button purchase" function in a remote control 111, one way is to include a dedicated key such as a "buy" key 112. It is anticipated that, in some embodiments, the "buy" key 112 is made difficult to inadvertently press by, for example, requiring extra force, embedding the "buy" key 112 in a raised area that requires insertion of a small object, requiring the "buy" key 112 to be pressed for a longer period of time or double pressed, etc.

Equivalent elements can be substituted for the ones set forth above such that they perform in substantially the same manner in substantially the same way for achieving substantially the same result.

It is believed that the system and method and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for simplified purchasing from a television device, the system comprising:

a video receiver, receiving a video stream at the television device, and receiving metadata, the metadata related to a current program playing on the video stream;

a display part, that displays the current program;

a memory that stores multiple different templates, and relationships between the multiple different templates, including multiple search query templates, multiple search query send templates, multiple search result format templates, and multiple profile templates respectively for different users; and processing unit, operating the display part and operating to execute a preference set up routine, which creates and modifies said multiple different templates, including selecting multiple different Internet sites to be searched using metadata-received information, and order of using said multiple different Internet sites, and a timeout strategy for the multiple different sites, the processing unit receiving a command from a remote control, the command indicating a request to find further information about a currently playing program, and the processing unit operating using a selected search query template to create a search query using said metadata, where said search template includes multiple different functions, each of which can be selected by a user based on commands from said remote control, the processing unit operating using a selected query send template to select multiple different search targets, an amount of a timeout for each said search target, and an action to carry out on error for each of said search targets, where a search query formed using said search query template is sent using directives from said query send template, the processing unit operating using a selected search result display template which defines how results received from said search query are displayed and creates an output indicative thereof which is displayed on said display part, and the processing unit operating using a viewer profile template which includes information about which of the multiple search query templates is used as said selected search query template, and which of the multiple search query send templates is used as said selected search query send template, and which of the multiple search results format templates is used as said selected search results display template, for each of a plurality of users, where different users include different viewer profile templates, said templates used to extract a term from the metadata to produce a command that is sent using said templates.

2. The system of claim 1, wherein the video stream is from an input selected from the group comprising an HDMI input, an ATSC input from a tuner, or a QAP encoded MPEG input from a cable input.

3. The system of claim 1, wherein the processing unit automatically executes a purchase of a product related to the current program, by using information in said templates.

4. The system of claim 1, further comprising a configuration file set up routine, executed by the processing unit, which sets up purchasing information for purchases that are based on results from said multiple different Internet sites, wherein the configuration file is stored at the television and the purchasing information includes purchase selections including all of on-line store addresses, on-line store account information, default shipping addresses, selection defaults, email addresses, selection criteria and credit card information.

5. The system of claim 4, wherein the configuration file is populated using a user interface at the device.

6. The system of claim 1, wherein the information received from the said multiple different Internet sites is selected using the one of said multiple different Internet sites which has a shortest delivery time.

7. The system of claim 6, further comprising an intermediate server networked to the device, at least part of a configuration file is stored at the intermediate server and the purchase using purchasing data and at least one term is at least partially performed by the intermediate server.

8. The system of claim 1, wherein the metadata includes a title of a program being watched.

9. A television comprising:
a processor, the processor in digital communication with a network;
a display operably interfaced to the processor;
a memory storing a configuration file interfaced to the processor, the configuration file comprising multiple different templates, and relationships between the multiple different templates, including multiple search query templates, multiple search query send templates, multiple search result format templates, and multiple profile templates respectively for different users;
the memory also storing metadata that is related to the content, the metadata includes at least one term that describes content currently being played, and which changes when the content changes;
the processor receiving a command from a remote control, the command indicating a request to find further information about a currently playing program, and using the metadata to produce a command that is sent to said Internet sites over the Internet using a selected search query template to create a search query using said metadata, where said search template includes multiple different functions, each of which can be selected by a user based on commands from said remote control,
the processor operating using a selected query send template to select multiple different search targets, an amount of a timeout for each said search target, and an action to carry out on error for each of said search targets, where a search query formed using said search query template is sent using directives from said query send template,
the processor operating using a selected search result display template which defines how results received from said search query are displayed and creates an output indicative thereof which is displayed on said display part, and
the processor operating using a viewer profile template which includes information about which of the multiple search query templates is used as said selected search query template, and which of the multiple search query send templates is used as said selected search query send template, and which of the multiple search results display templates is used as said selected search results format template, for each of a plurality of users, and to receive information from the Internet sites responsive to the command and to display the information on the display.

10. The television of claim 9, wherein the configuration file including information about multiple different online stores, and where the processor receives a buy request for a product related to the content currently being played, from the remote control, and responsive to receiving the buy request, using the metadata, the metadata indicative of content currently being viewed on a display of the television to send a request to each of the multiple different online stores using the purchasing data and the metadata indicative of the current content being played;
displaying pricing results from the multiple different online stores that have the product; and
receiving a selection of a purchase from a user initiating a purchase of the product at one of the on-line stores using the purchasing data from the configuration file.

11. The television of claim 10, wherein the processor formulates a search request to the internet sites using information from the metadata and automatically executes a purchase by comparing said information with default purchase information, and automatically selecting one of said different Internet sites, and automatically executing a purchase for said one of said different sites.

12. The television of claim 11, further comprising a configuration file set up routine, executed by the processor, which sets up said default purchase information that are based on results from the Internet sites.

13. The television of claim 11 wherein said one of said different Internet sites is selected which has a shortest delivery time.

14. The television of claim 9, wherein the purchasing data includes purchase selections selected from the group consisting of on-line store addresses, on-line store account information, default shipping addresses, selection defaults, email addresses, selection criteria and credit card information.

15. The system of claim 7, wherein said intermediate receiver receives a query in a proprietary protocol that embeds search terms in an XML search.

* * * * *